3,075,784
Patented Jan. 29, 1963

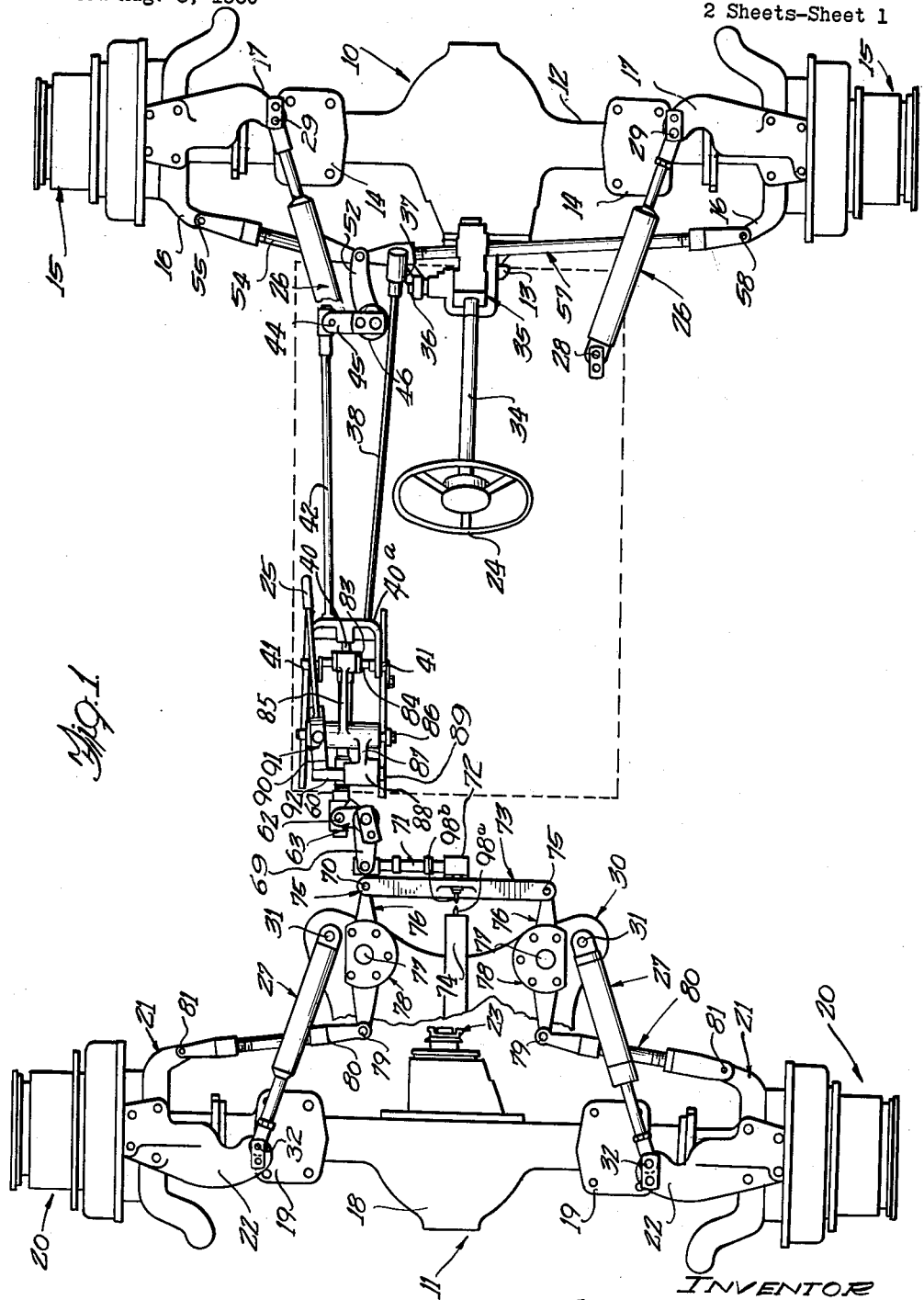

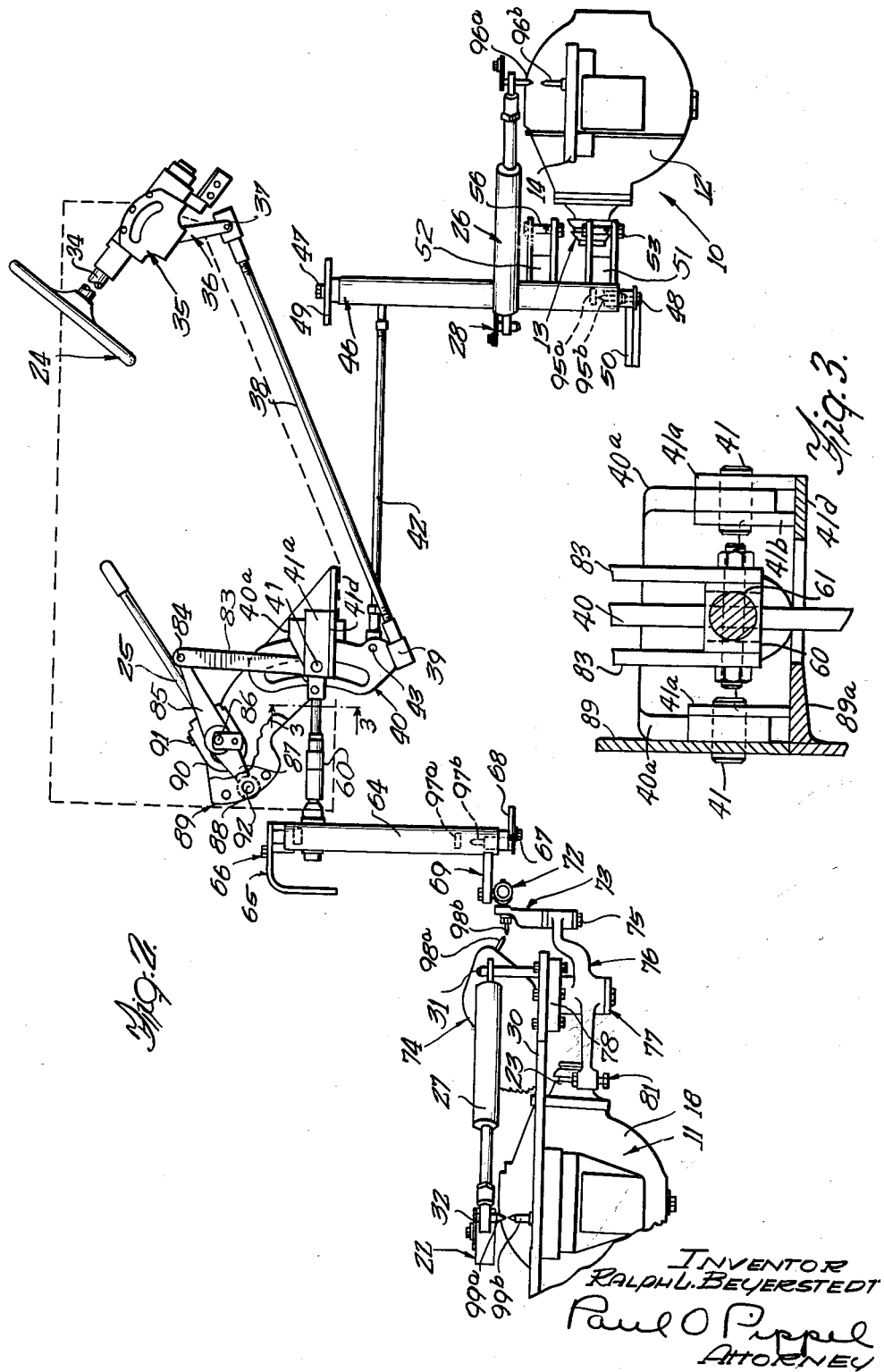

3,075,784
FOUR WHEEL TRACTOR STEERING
ARRANGEMENT
Ralph L. Beyerstedt, Libertyville, Ill., assignor to The
Frank G. Hough Co., a corporation of Illinois
Filed Aug. 8, 1960, Ser. No. 48,102
9 Claims. (Cl. 280—91)

This invention relates to steering systems for wheeled vehicles, and more specifically to an improved steering system and alignment means for a vehicle having four steerable wheels.

In the use of four-wheel steered vehicles, a number of problems have been encountered when attempts have been made to coordinate the steering of the rearward set of wheels with the forward pair of wheels. Further problems have arisen when atempts have been made to provide a steering system which is selectively operable to provide different coordinated patterns of operation of the rearward wheels relative to the forward wheels. The three desirable steering patterns are, steering by one pair of wheels, either the forward or rearward set, four-wheel steering wherein the rearward wheels turn in the opposite direction from which the forward wheels are turned so that the rearward wheels tend to follow the tracks of the forward wheels, and four-wheel steering wherein the rearward wheels turn in the same direction as the forward wheels so that the vehicle tends to move at an oblique angle to the longitudinal axis of the vehicle. The noted problems have been further complicated when necessary maintenance or repairs are made due to the difficulty of alignment or realignment of the steering system because of the structural complexity thereof.

It is the object of the present invention to provide a steering system for a tractor having four steerable wheels wherein the system is relatively simple in construction and positive in operation.

It is a further object of the present invention to provide a steering system, such as noted immediately above, with certain means which are selectively operable to provide for different coordinated patterns of steering of the four wheels of the vehicle.

It is a further object of the present invention to provide a four-wheel steering system with controls carried in an operator's compartment in the upper portion of the vehicle and somewhat centrally of the ends thereof for coordinating the steering of the wheels and with simple and efficient linkage and leverage means for transferring mechanical movements in and relative to the control means forwardly and downwardly to the forward wheels and rearwardly and downwardly to the rear wheels of the vehicle by the use of certain vertically positioned cylindrical members.

It is a further object of the present invention to provide certain alignment means in a four-wheel steered vehicle which provide for the relatively simple and easy alignment and realignment of the steering system.

Other objects and features of the present invention will be apparent upon a perusal of the following specification and drawings of which:

FIGURE 1 is a top plan view of the steering system and alignment means of the present invention;

FIGURE 2 is a side-elevational view of the structure shown in FIGURE 1; and

FIGURE 3 is an enlarged fragmentary view along section line 3—3 of FIGURE 2 showing certain details of the subject invention.

The present embodiment is the preferred embodiment, but it is to be understood that changes can be made in the present embodiment by one skilled in the art without departing from the spirit and scope of the present invention.

For a general description of the present invention reference is made to the drawings. As may be seen in FIGURE 2, this invention is provided for a vehicle wherein the operator's compartment, shown in dotted lines, is disposed somewhat centrally between and considerably above the forward and rearward axles of the vehicle. Selectively operable control means, including the well-known Stephenson Link, are carried in the operator's compartment on one side of the vehicle. A steering wheel assembly is provided in the vehicle and the steering wheel thereof extends into the operator's compartment. The operation of the steering wheel by the operator of the vehicle results in the longitudinally reciprocating movement of a relatively long link which extends from the lower end of the steering column rearwardly to the control means for different coordinated patterns of steering. From the control means, links are extended substantially horizontally forwardly and rearwardly of the vehicle. The link extending forwardly of the vehicle is connected to a vertically disposed relatively long cylindrical member which is carried for pivotal movement about a vertically disposed axis adjacent the forward wheel assembly. The lower end of that cylindrical assembly is pivotally connected by suitable steering links to the forward wheels of the vehicle. The link which extends rearwardly from the control means is pivotally connected to the upper end of a second vertically disposed relatively long cylindrical member which is pivotally carried in the tractor for pivotal movement about a vertical axis disposed adjacent the rear axle assembly of the vehicle. Various links and levers are operatively connected between the lower end of the second cylindrical member and the wheels of the rear axle assembly. This described arrangement provides for simple and positive control of the steerable wheels from the operator's compartment with a simple and efficient distribution of steering movements of the steering wheel to the control means at the center of the vehicle and from the control means forwardly and rearwardly to the cylindrical members and from the cylindrical members downwardly and then forwardly and rearwardly to the forward and rearward axle assemblies.

The alignment means of the present invention comprises the use of a plurality of pairs of pointers, carried at predetermined fixed positions on the vehicle and on various ones of the adjustable members of the steering system in cooperation with each other. This alignment arrangement provides that when all of the pair of pointers are disposed so that the distance between the tips of each pair are at a minimum, the steering system is properly aligned. Thus, complex measurements from base reference points are eliminated and the possibility of error is greatly reduced.

For a detailed description of the present invention continued reference is made to the drawings. The frame and various other members of the vehicle, such as the body, are not shown in order not to unnecessarily complicate the description of the present invention, it being believed sufficient to describe those members which in the subject invention are fixed at some particular position in the vehicle. The specific means for fixing the various members may be done by any suitable means known in the art, such as the use of various types of well-known brackets or flanges. The forward axle assembly is indicated by the numeral 10 and the rearward axle assembly is indicated by the numeral 11. The axle assemblies 10 and 11 may be of any suitable type known in the art. The showing of the forward axle assembly 10 of the present embodiment includes a rigid axle housing 12 enlarged in the central portion thereof for a differential carrier.

Input drive to the axle assembly 10 is by means of the portion of the universal joint 13. Flanges 14 with suitable holes therethrough are provided for securing the axle assembly 10 to the frame of the vehicle. Each end of the axle housing 12 carries a hub assembly 15 mounted thereon by a suitable kingpin arrangement. The hub assembly 15 carries a number of steering arms, such as steering arm 16 and steering arm 17 for pivoting or steering the hub assembly relative to the axle housing 12. It is understood that suitable wheels (not shown) are mounted on each of the hub assemblies.

The rearward axle assembly 11 is similar to the forward axle assembly 10 and also comprises an axle housing which is indicated at 18, mounting pads or flanges 19, and hub assemblies 20. The hub assemblies 20 are provided with steering arms 21 and 22 for steering of the hub assemblies 20 relative to the axle housing 18. Drive to the rearward axle assembly 11 is through the portion of the universal joint 23. It is intended, of course, that the forward and rearward axle assemblies 10 and 11 are disposed one at each end of the vehicle with the frame and body of the vehicle being disposed on top of these assemblies.

The operator's compartment of the vehicle for the present invention is shown in dotted lines and may be generally defined as that area about the steering wheel 24 and the hand lever 25.

The steering system of the subject invention contemplates the use of power-assist means for aiding the operator of the vehicle in steering the wheels, and to this end two pairs of hydraulic cylinders 26 and 27 are shown. The head end of each of the hydraulic cylinders 26 are pivotally carried on pin means 28, which in turn are fixedly carried in the vehicle. The rod end of each of the hydraulic cylinders 26 are pivotally connected by pin means 29 to the outer end of the steering arms 17 of the hub assemblies 15. The present invention further contemplates that the rearward axle assembly 11 is carried for oscillation about a longitudinal center line of the vehicle and therefore a portion of the outline of a carrier 30 is shown. The carrier 30 is, of course, secured to the flanges 19 of axle assembly 11 and the carrier 30 in turn is pivotally carried by the vehicle for pivotal movement about a longitudinal center line of the vehicle substantially horizontally through the plane of the carrier 30. The head end of each hydraulic cylinder 27 is pivotally carried on the carrier 30 by pin means 31. The rod end of each hydraulic cylinder 27 is pivotally connected by pin means 32 to the outer end of the steering arms 22. Suitable hydraulic fluid conduits, pump, reservoir and valve means (not shown) are provided for operation of the hydraulic cylinders 26 and 27. Those elements are not shown and described for the reason that the subject invention is basically directed to the mechanical steering system and alignment means therefor.

The steering wheel 24 is operatively carried on the steering column 34 which in turn is connected to the gearing means 35 for translating rotations of the steering wheel 24 into corresponding pivotal movements of the lever 36. The steering column 34 and gearing means 35 are fixedly carried in the motor vehicle. The outer end of the lever 36 of the gearing means 35 is pivotally connected at 37 to one end of a link 38. The link 38 extends from 37 in a generally rearward direction, and the other end thereof is pivotally connected by pin means 39 to the lower end of a Stephenson-type link 40 attached to supporting link 40a. The link 40 and supporting link 40a are carried in the vehicle for pivotal movement about the axis of pin means 41. Pin means 41 is fixedly carried in the vehicle by a suitable bracket indicated by reference numbers 41a, 41b, 41a and 89 best shown in FIGURE 3. Thus, it may be seen that movements of the steering wheel 24 will result in reciprocating longitudinal movements of link 38 and pivotal movements of link 40 and supporting link 40a about the axis of pin means 41.

To complete the description for the portion of the steering assembly relating to the forward wheels, a link 42 is provided, and one end of that link is pivotally connected at pin means 43 to the lower portion of the link 40. Since the axis of pin means 41 is disposed above both of the pivotal mounting means 39 and 43, it may be seen that when link 38 is moved rearwardly, link 42 is also moved rearwardly, and forward movements of link 38 relative to the vehicle result in forward movements of the link 42. The forward end of link 42 is pivotally connected at pin means 44 to the outer end of the lever arm 45. The lever arm 45 is secured to a cylindrical member 46 near the upper end thereof and extends radially outwardly therefrom. The cylindrical member 46 is of a substantial length and is rotatively carried for pivotal movement about a vertical axis by pin means 47 at the upper end thereof and pin means 48 at the lower end thereof. Pin means 47 is supported in a bracket 49 which is fixedly carried in the vehicle, and pin means 48 is carried by a bracket 50 which is also fixedly carried in the vehicle. The lower end of the cylindrical member 46 is provided with two vertically aligned bifurcated lever arms 51 and 52. These lever arms 51 and 52 extend radially outwardly from the cylindrical member 46 in a generally forward direction. The outer end of lever arm 51 is pivotally connected by pin means 53 to one end of a link 54. The other end of the link 54 is pivotally connected at pin means 55 to the outer end of the steering arm 16 of the hub assembly 15 on the left side of the vehicle. Lever arm 52 is connected by pin means 56 to one end of a link 57. Link 57 extends toward the right side of the motor vehicle, and at pin means 58 is pivotally connected to the outer end of the steering arm 16 of the hub assembly 15 at the right side of the vehicle. Thus, it may be seen that when link 42 is reciprocated forwardly and rearwardly relative to the vehicle, the cylindrical member 46 is pivoted about its vertical axis, and the links 54 and 57 are moved transversely of the vehicle through the pivotal movement of the levers 51 and 52 at the lower end of the cylindrical member 46, to steer the front wheels of the vehicle.

Turning next to a detailed description of the construction of the portion of the steering system for the rearward wheels, these wheels are steered from the link 60 in a manner to be described below. The forward end of the link 60 carries a pin 61 shown in FIG. 3 which is carried in the slot of link 40. The other end of link 60 is connected by a universal arrangement 62 to a lever arm 63. Lever arm 63 is carried on a cylindrical member 64 and extends radially outwardly therefrom at the upper end thereof. Cylindrical member 64 is of a relatively long length and similarly to cylindrical member 46 is rotatively carried in the vehicle for pivotal movement about a vertical axis. The upper end of cylindrical member 64 is rotatively supported from a bracket 65 by pin means 66. Bracket 65 is fixedly carried in the motor vehicle. The lower end of cylindrical member 64 is pivotally carried by pin means 67 which in turn is carried by a bracket 68, which in turn is fixedly carried in the motor vehicle. The universal mounting means 62 for the link 60 provides that the link 60 is pivotal about a horizontal transverse axis through the upper portion of the cylindrical member 64 and is movable along its longitudinal axis to pivot cylindrical member 64 about its vertically disposed axis. The lower end of cylindrical member 64 carries a lever arm 69 which extends radially outwardly therefrom substantially rearwardly of the vehicle. The outer end of lever arm 69 is pivotally connected by pin means 70 to one end of a link 71. The other end of the link 71 carries a ball joint 72. The socket portion of the ball joint 72 is carried on the link 71 and the ball member is connected to a link 73 substantially at the longitudinal center of link 73. The central portion of link 73 is disposed somewhat upwardly or higher than the end portions thereof and the ball joint 72 lies on the longitudinal axis about which the rear axle assembly 11 and carrier 30 oscillates relative to the remainder of the vehicle. The member 74, part of which is shown in the drawings, is a portion of the carrier 30 and is disposed on the longitudinal center line of the vehicle. Although not shown, this member 74 carries pin means which is connected to the underside of the frame of the vehicle for oscillating the carrier 30 and axle assembly 11 relative to the vehicle frame. The ends of the link 73 are each pivotally connected by pin means 75 to one end of each of the lever assemblies 76. Each of the lever assemblies 76 is pivotally carried intermediate its ends by pin means 77 and brackets 78 on and below the carrier 30 at each side portion thereof forwardly of the axle assembly 11. The other ends of the lever assemblies 76 extend generally rearwardly of the vehicle, and are each pivotally connected by pin means 79 to one end of each of a pair of links 80. The other end of each of the links 80 is pivotally connected by pin means 81 to the outer end of the steering arms 21 of each of the hub assemblies 20 of the rear wheels of the vehicle. Thus it may be seen that when the link 60 is moved along its longitudinal axis, the cylindrical member 64 is pivoted about its vertical axis to move lever arm 69. Lever arm 69 in turn will move link 71 substantially along its longtudinal axis transversely of the vehicle, to in turn move link 73 along its longitudinal axis transversely of the vehicle. The transverse movement of link 73 will result in the simultaneous pivoting of lever assemblies 76 about pin means 77. The lever assemblies 76 will in turn move the links 80, which in turn will pivot the hub assemblies 20 of the rear wheels of the vehicle.

Turning next to the manner in which link 60 is moved, it may be seen that when the pin 61 is aligned so that the axis of the pin 61 coincides with the axis of the pin 41 about which link 40 pivots as shown in FIGURE 3, any movement of link 40 about its pivotal axis will result in no movement of the link 60. In other words, when link 60 is positioned substantially as shown in the drawings, the steering of the vehicle is by the front wheels only, the rear wheels being positioned in a straight-ahead direction. To provide the different coordinated steering patterns, the hand lever 25 and the members connected thereto and to the link 60 are provided. A link 83 is pivotally connected at its lower end to the outer ends of pin 61 as shown in FIGURE 3. The upper or other end of the link 83 is pivotally connected by pin means 84 to the outer end of a lever arm 85. Lever arm 85 is formed at its other end as a sleeve member which sleeve member is journalled on pin means 86. Pin means 86 is fixedly carried in the motor vehicle. The sleeve of the lever 85 carries a short lever arm 87 extending radially outwardly therefrom in a direction opposite from that of the other portion of the lever arm 85, and the outer end of lever arm 87 carries a sleeve 88. A plate 89 is provided in the vehicle and is fixedly carried therein in cooperation with the sleeve 88 of the short lever arm 87. The plate 89 is provided with three holes therein, each of the holes lying on the arc of a circle having its center at the axis of pin means 86. Further, the holes in the plate 89 are so positioned that the hole through sleeve 88 may be aligned with any one of the three holes. The sleeve of the lever arm 85 further carries the hand lever 25.

The hand lever 25 is formed at its lower end with a bale member 90 which is pivotally mounted by pin means 91 on the sleeve portion of the lever 85. The axis of pin means 91 is positioned parallel to a cord of the circle defined by the sleeve of lever arm 85. The end of the bale 90, opposite from that to which hand lever 25 is fixedly secured, carries a pin 92. The pin 92 is pivotally carried on the bale 90, and is journaled through the sleeve 88 of the short lever arm 87 and into one of the holes in the plate 89. As shown in the drawings, the pin 92 is positioned through the middle one of the three holes. In operation, the hand lever 25 is moved toward the center of the vehicle. This results in a pivotal movement of the bale 90 about the axis of pin means 91 causing the pin 92 to be withdrawn from the hole in plate 89. Hand lever 25 may then be raised or lowered to pivot the sleeve of lever arm 85 about the axis of pin means 86. This results in an upward or downward movement of lever arm 85 depending upon the direction in which hand lever 25 has been moved. The upward and downward movement of lever arm 85 results in an upward and downward movement of the link 83, the end of link 83 and the end of the link 60 both being carried by the pin 61 to either the upper or lower end of the slot in link 40. When the pin 61 is at the lower end of the slot in link 40, the pin 92 is aligned with the upper hole in plate 89, and the hand lever 25 may then be moved outwardly of the tractor to project pin 92 into the upper one of the three holes in plate 89 to lock the lever arm 85 in that position. When the end of both links 83 and 60 are raised until the pin 61 is in the upper end of the slot in link 40, the pin 92 is aligned with the lower one of the three holes in plate 89.

Turning next to a description of the operation and movements of the link 60 when the pin 61 thereof is disposed in the upper and lower ends of the slot in the link 40, the operation with the pin 61 in the upper end of the slot of the link 40 will be first described. Assuming that the steering wheel 24 is turned to cause a rearward movement of the link 38, the link 42 is also moved rearwardly to pivot the cylindrical member 46 in a counterclockwise direction, as viewed in FIGURE 1, which in turn will rotate lever arms 52 and 51 in a counterclockwise direction to turn the forward wheels of the vehicle to the right. The rearward movement of the link 38 will cause a forward movement of the upper portion of the slotted link 40, which in turn will move link 60 forwardly, in which in turn will pivot the cylindrical member 64 clockwise, as viewed in FIGURE 1. This will cause a clockwise movement of lever arm 69 and a movement of links 71 and 73 toward the left side of the vehicle. The lever assemblies 76 will then be pivoted counterclockwise, as viewed in FIGURE 1, to in turn pivot the wheels toward the right side of the vehicle. Thus, this coordinated steering pattern between the forward wheels and the rearward wheels is one wherein the rearward wheels are turned in the same direction that the forward wheels are turned. This position of the wheels is often called a "crab" position because the vehicle tends to move at a oblique angle to its longitudinal axis somewhat in the manner of a crab.

Considering next that the pin 61 is disposed in the lower end of the slot of the pivoted link 40, and that the steering wheel 24 is again turned so that the link 38 is moved rearwardly of the vehicle. Again, the forward wheels of the vehicle will be steered to the right. However, the rearward wheels will be steered to the left. This is a result of the pivotal movement of the slotted link 40 in the clockwise direction, as viewed in FIGURE 2, which will cause the link 60 to be moved rearwardly of the vehicle, which in turn will pivot the cylindrical member 64 in a counterclockwise direction, as viewed in FIGURE 1. This movement of cylindrical member 64 will cause the links 71 and 73 to be moved toward the right of the vehicle. The lever assemblies 76 will then be pivoted clockwise, as viewed in FIGURE 1, and through links 80 will cause the rear wheels to be turned toward the left.

Turning next to the pivotal connection of the attached link 40 on supporting U-shaped link 40a to the supporting frame member of the vehicle and the end connection of both links 60 and 83 to the slot of link 40 is best illustrated in FIGURE 3. Specifically link 40 is fixedly attached to the center of the back portion of U-shaped supporting link 40a in a suitable manner such as a series of bolt fasteners, not shown. A series of plates 41a and 41b are fixedly attached to a supporting plate 41d to pivotally support one arm of U-shaped link 40a through an assembled pin 41 in aligned openings on the plates 41a and 41b and arm portion of link 40a. Plate 41d is fixedly attached to channel member 89a partly shown in cross section in FIGURE 3 that forms part of the vehicle chassis. The lower end of plate 89 shown also in cross section in FIGURE 3 and another plate 41a similar to the first plate 41a on plate 41d are fixedly attached to chassis member 89a. All these plates 41a, 41b, 41d, 89 and chassis member 89a can be fixedly attached as aforedescribed in a suitable manner such as welding. Plates 41a and 89 on member 89a have aligned openings along with an opening in the other arm portion of U-shaped link 40a to assemble a second pin 41 for pivotal connection of link 40a. It is now to be understood that the two pins 41 when assembled as shown in FIGURE 3 are spaced apart and lie on a common axis. Link 83 as shown in FIGURE 3 has a bifurcated end overlapping the bifurcated end of link 60. Both bifurcated ends of links 60 and 83 are connected to the slot of link 40 through fastened transverse pin 61. A roller bearing assembly of conventional construction not shown in FIGURE 3 is positioned in the center of fastened pin 61 to facilitate sliding bearing contact with the slot of link 40. Thus with the axis of pin 61 coaxial wtih the spaced-apart pins 41 in FIGURE 3 movement of steering link 38 causes no movement of link 60 connected to the rear wheels. However, if pin 61 is moved to the upper end of the slot in link 40 through selective actuation of link 83 by manual lever 25, then movement of steering link 38 causes movement of link 60 and pin 61 about the axis of pins 41. Similarly, if pin 61 is moved to the lower end of slot in link 40 through selective actuation of link 83 by manual lever 25 in FIGURE 2 then movement of steering link 38 causes movement of link 60 and pin 61 to move about the axis of pins 41.

Because of the number of links and levers involved in the construction of the subject invention and because of their various positions, the alignment means of the present invention are quite important. In order to align the various members of the subject invention, many of the individual members are adjustable in length. These are, for example, the links 60, 71, and 80 at the rearward end of the vehicle and links 38, 42, 54, and 57 in the forward portion of the vehicle. In the original construction, and the later repair and maintenance of various parts of the subject invention, it is desirable to avoid the necessity for complex jigs to align the various members. The relatively simple means of the present invention comprises a plurality of pairs of pointers. These pointers are numbered and located as follows:

Pointers 95a and 95b with pointer 95b being carried on the bracket 50 which supports the pivot means 48 at the lower end of the cylindrical assembly 46 and with 95a the cooperating pointer of the pair secured to cylindrical member 46 and projecting radially outwardly therefrom over pointer 95a, pointers 96a and 96b with pointer 96a being carried on the steering arm 17 of the forward right wheel to depend therefrom in alignment with pointer 96b which is secured to the axle housing 12 to upstand therefrom, another pair of pointers, not shown in the drawings, are provided for the left front wheel assembly and similarly to pointers 96a and 96b are carried between the axle housing 12 and the steering arm 17 for the left front wheel, pointers 97a and 97b with 97a being secured to the cylindrical member 64 to extend radially outwardly therefrom over and in cooperation with the tip of pointer 97b which is carried on the bracket 68 for the pin means 67 and upstands therefrom, pointers 98a and 98b with pointer 98a secured to the plate 74 of the carrier 30 of the rear wheel assembly to extend forwardly thereof along the longitudinal center line of the vehicle toward pointer 98b which is carried on the link 73 and extends along the center line of the ball joint 72, pointers 99a and 99b with pointer 99a being carried on the outer end of the steering arm 22 of the right rear wheel assembly to depend therefrom toward pointer 99b which is carried on the axle housing 18 of the rear axle assembly 11 to upstand therefrom toward and in alignment with pointer 99a, and another pair of pointers for the left rear wheel assembly which are carried similarly to pointers 99a and 99b between the axle housing 18 of the rear axle assembly 11 and the steering arm 22 of the left rear wheel. To align the steering system of the subject invention, it is merely necessary to adjust the lengths of the various adjustable links cooperating with any specific pair of pointers to align the pointers with their tips in closest proximity to each other. For example, by appropriate changes in the length of the link 57, the forward right hub assembly 15 may be pivoted about its kingpin until pointers 96a and 96b are in axial alignment. The same may be said for the pair of pointers for the left front wheel assembly wherein the length of the link 54 is changed until the pointers therefor are in alignment. The cylindrical member 46 is properly aligned relative to the links 54 and 57 by appropriate changes in the length of link 42, it being understood that the alignment is basically established from the construction and relative disposition of the slotted link 40 and its associated members. Changes of length in link 60 will result in the proper alignment of the various lever arms of cylindrical member 54 when pointers 97a and 97b are in alignment with each other. The link 71 is changed in length to shift the link 73 to insure the positioning of the ball joint 72 and the link 73 on the longitudinal center line of the vehicle, and this is accomplished when the tips of the pointers 98a and 98b are in closest proximity to each other. Similarly to the forward wheel assemblies, the rearward hub assemblies 20 are properly aligned by changes in length of the links 80 until the tips of the pointers such as the pair of pointers 99a and 99b are at a minimum dimension from each other. Thus, it may be seen that the replacement of any portion of the steering system such as the one of the hub assemblies will not complicate the realignment of the system since upon the reassembly of the system the appropriate pointers need merely be positioned in closest proximity to each other.

Having described the invention what is considered new and desired to be protected by Letters Patent is:

1. In a steering system for a four-wheeled vehicle having said four wheels pivotally carried on axle assemblies for steering movement and having an operator's compartment disposed substantially above the plane of said axle assemblies comprising, selectively operable steering means carried in the operator's compartment of said vehicle intermediate the ends and in the upper portion of said vehicle for selectively providing different coordinated steering patterns of said four wheels, first linkage means connected to said selectively operable steering means and extending substantially horizontally forwardly of said vehicle, a first cylindrical member pivotally carried in said vehicle for pivotal movement about a vertical axis disposed adjacent the forward wheels of said vehicle, first leverage means formed on the upper end of said first cylindrical member and connected to said first linkage means for pivotal movement of said first cylindrical member responsive to operation of said selectively operable steering means, second leverage means formed on the lower end of said first cylindrical member, second linkage means connected to said second leverage means on the lower end of said first cylindrical member and extending substantially horizontally forwardly to pivotal connections with the forward wheels of said vehicle for steering movement of said forward wheels responsive to pivotal movements of said first cylindrical member, third linkage means connected to said selectively operable steering means and extending substantially horizontally rearwardly of said vehicle, a second cylindrical member pivotally carried in said vehicle for pivotal movement about a vertical axis adjacent the rearward wheels of said vehicle, first leverage means formed on the upper end of said second cylindrical member and connected to said third linkage means for pivotal movement of said second cylindrical member responsive to operations of said selectively operable steering means, second leverage means formed on the lower end of said second cylindrical member, first linkage and leverage means connected to said second leverage means on the lower end of said second cylindrical member and extending substantially horizontally rearwardly to pivotal connections with the rearward wheels of said vehicle for steering movement of said rearward wheels responsive to pivotal movements of said second cylindrical member.

2. In a steering system for a four-wheeled vehicle having said four wheels pivotally carried on axle assemblies for steering movement and having an operator's compartment disposed substantially above the plane of said axle assemblies comprising, a steering wheel assembly carried on the forward portion of said vehicle and extending into the operator's compartment of said vehicle, selectively operable means carried in said operator's compartment of said vehicle intermediate the ends of said vehicle for selectively providing different coordinated steering patterns of said four wheels, linkage means connected to said steering wheel assembly and to said selectively operable means, said linkage means being responsive to steering movement of said steering wheel assembly, first linkage and leverage means connected to said selectively operable means and to the forward wheels of said vehicle for steering movement of said forward wheels responsive to movements of said steering wheel assembly, said first linkage and leverage means including a cylindrical member carried in said vehicle for pivotal movement about a vertical axis and having leverage means at the upper and lower ends thereof with the leverage means at the upper end thereof being connected to said selectively operable means and the leverage means at the lower end thereof being connected to said forward wheels, second linkage and leverage means connected to said selectively operable means and to the rearward wheels of said vehicle for steering movement of said rear wheels responsive to movements of said steering wheel assembly and the operated position of said selectively operable means.

3. In a steering system for a four-wheeled vehicle having said four wheels pivotally carried on axle assemblies for steering movement and having an operator's compartment disposed substantially above the plane of said axle assemblies comprising, a steering wheel assembly carried on the forward portion of said vehicle and extending into the operator's compartment of said vehicle, selectively operable means carried in said operator's compartment of said vehicle intermediate the ends of said vehicle for selectively providing different coordinated steering patterns of said four wheels, linkage means connected to said steering wheel assembly and to said selectively operable means, said linkage means being responsive to steering movement of said steering wheel assembly, first linkage and leverage means connected to said selectively operable means and the forward wheels of said vehicle for steering movement of said forward wheels responsive to movement of said steering wheel assembly, second linkage and leverage means connected to said selectively operable means and to the rearward wheels of said vehicle for steering movement of said rear wheels responsive to movements of said steering wheel assembly and the operated position of said selectively operable means, said second linkage and leverage means comprising a cylindrical member pivotally carried in said vehicle for pivotal movement about a vertical axis, a link and lever operatively connected between the upper end of said cylindrical member and said selectively operable means for pivotal movement of said cylindrical member responsive to movements of said steering wheel, a plurality of links and levers connected between the lower end of said cylindrical member and said rear wheels for steering movement of said rear wheels responsive to pivotal movements of said cylindrical member.

4. In a steering system for a four-wheeled vehicle having said four wheels pivotally carried on axle assemblies for steering movement and having an operator's compartment disposed substantially above the plane of said axle assemblies comprising, steering gear means carried on the forward portion of said vehicle, a steering wheel and column assembly operatively connected to said steering gear assembly and extending upwardly and rearwardly of said steering gear assembly into the operator's compartment of said vehicle intermediate the ends of said vehicle, selectively operable means carried in said operator's compartment of said vehicle rearwardly of said steering wheel for selectively providing different coordinated steering patterns of said four wheels, first linkage means operatively connected between said steering gear assembly and said selectively operable means, second linkage means connected to said selectively operable means and extending forwardly of said vehicle, a cylindrical member pivotally carried in said vehicle for pivotal movement about a vertical axis and positioned adjacent the forward wheels of said vehicle, first leverage means formed on the upper end of said cylindrical member and connected to said second linkage means so that said cylindrical member is pivoted responsive to steering movement of said steering wheel, second leverage means formed on the lower end of said cylindrical member, third linkage means connected between said second leverage means and the forward wheels of said vehicle for steering movement of said forward wheels responsive to pivotal movements of said cylindrical member, first linkage and leverage means connected at one end thereof to said selectively operable means and extending rearwardly of said vehicle and operatively connected to the rear wheels of said vehicle for steering movement of said rear wheels responsive to steering movement of said steering wheel and the operated position of said selectively operable means.

5. In a steering system for a four-wheeled vehicle having said four wheels pivotally carried on axle assemblies for steering movement and having an operator's compartment disposed substantially above the plane of said axle assemblies comprising, steering gear means carried on the forward portion of said vehicle, a steering wheel and column assembly operatively connected to said steering gear assembly and extending upwardly and rearwardly of said steering gear assembly into the operator's compartment of said vehicle intermediate the ends of said vehicle, selectively operable means carried in said operator's compartment of said vehicle rearwardly of said steering wheel for selectively providing different coordinated steering patterns of said four wheels, first linkage means operatively connected between said steering gear assembly and said selectively operable means, first linkage and leverage means connected to said selectively operable means and extending forwardly of said vehicle and connected to the forward wheels of said vehicle for steering movement of said forward wheels responsive to steering movements of said steering wheel, second linkage means connected at one end thereof to said selectively operable means and extending rearwardly of said vehicle, a cylindrical member pivotally carried in said vehicle for pivotal movement about a vertical axis disposed substantially adjacent the rear wheels of said vehicle, leverage means formed on the upper end of said cylindrical member and connected to said second linkage means so that said cylindrical member is pivoted responsive to steering movements of said steering wheel and the operated position of said selectively operable means, a second leverage means formed on the lower end of said cylindrical member, second linkage and leverage means connected between said second leverage means on said cylindrical member and to the rearward wheels of said vehicle for steering movement of said rear wheels responsive to pivotal movements of said cylindrical member.

6. In a steering system for a four-wheeled vehicle having said four wheels pivotally carried on axle assemblies for steering movement and having an operator's compartment disposed substantially above the plane of said axle assemblies comprising, steering gear means carried on the forward portion of said vehicle, a steering wheel and column assembly operatively connected to said steering gear assembly and extending upwardly and rearwardly of said steering gear assembly to the operator's compartment of said vehicle intermediate the ends of said vehicle, selectively operable means carried in said operator's compartment of said vehicle rearwardly of said steering wheel for selectively providing different coordinated steering patterns of said four wheels, first linkage means operatively connected between said steering gear assembly and said selectively operable means, second linkage means connected to said selectively operable means and extending forwardly of said vehicle, a first cylindrical member pivotally carried in said vehicle for pivotal movement about a vertical axis disposed substantially adjacent the forward wheels of said vehicle, leverage means formed on the upper end of said cylindrical member and connected to said second linkage means for pivotal movement of said cylindrical member responsive to steering movements of said steering wheel, second leverage means formed on the lower end of said cylindrical member, third linkage means connected to said second leverage means on the lower end of said cylindrical member and connected to the forward wheels of said vehicle for steering movement of said forward wheels responsive to pivotal movements of said cylindrical member, fourth linkage means connected at one end thereof to said selectively operable means and extending substantially rearwardly of said vehicle, a second cylindrical member pivotally carried in said vehicle for pivotal movement about a vertical axis disposed substantially adjacent the rear wheels of said vehicle, first leverage means formed on the upper end of said second cylindrical member and connected to said fourth linkage means for pivotal movement of said second cylindrical member responsive to steering movement of said steering wheel and the operated position of said selectively operable means, second leverage means formed on the lower end of said second cylindrical member, first linkage and leverage means connected to said second leverage means on the lower end of said second cylindrical member and to the rearward wheels of said vehicle for steering movement of said rear wheels responsive to pivotal movements of said second cylindrical member.

7. In a steering system for a four-wheeled vehicle having said four wheels pivotally carried on axle assemblies for steering movement comprising, a steering wheel carried by said vehicle, linkage and leverage means connected between said steering wheel and said four wheels for steering said four wheels responsive to movements of said steering wheel, a steering arm and power-assist actuator means connected at one end to each other and associated with each of said four wheels, said steering arm at the other end connected to each of said wheels, said actuator means at the other end connected to said vehicle, said linkage and leverage means including a plurality of links being formed to be adjustable in length, and a plurality of pairs of pointers, one pointer of each pair of pointers being carried at a predetermined fixed position in said vehicle, and the other pointer of each pair of pointers being carried on said linkage and leverage means adjacent one of said links and said other pointer being further carried on each of said steering arms adjacent said actuator means, whereby said steering system is aligned when the pointers of each pair are positioned with the tips thereof in the closest spacing.

8. In a steering system for a four-wheeled vehicle having said four wheels pivotally carried on axle assemblies for steering movement comprising, a steering wheel carried by said vehicle, selectively operable means connected to said steering wheel for providing different coordinated steering patterns of said four wheels responsive to movement of said steering wheels and the operated position of said selectively operable means, first steering means including a plurality of interconnected members connected to said selectively operable means and the forward wheels of said vehicle for steering movement of said forward wheels responsive to movements of said steering wheel, second steering means including a second plurality of interconnected members connected between said selectively operable means and the rearward wheels of said vehicle for steering movement of said rearward wheels responsive to movements of said steering wheel, said first and said second steering means further including a steering arm and a power-assist actuator means for each of said four wheels, said steering arm and said actuator means connected at one end, said steering arm separately connected at the other end to each of said forward and said rearward wheels, said actuator means separately connected at the other end to said vehicle, means for adjusting the position of certain ones of said first plurality of interconnected members relative to others thereof, means for adjusting the position of certain ones of said second plurality of interconnected members relative to others thereof, a plurality of pairs of pointers, one pointer of each pair of pointers being carried by said first and second steering means in cooperation with certain ones of said first and second plurality of interconnected members, said one pointer of each pair of said pointers being also carried by said steering arm at said one end, said one pointer extending from said first and second steering means and said steering arm, and the other pointer of each pair of pointers being carried at certain predetermined fixed positions in said vehicle and extending toward said one pointer of each pair on said first and second steering means and said steering arm so that said steering system is aligned when the pointers of each pair are positioned in closest proximity of said one to said other of said pair of pointers.

9. In a steering system for a four-wheeled vehicle having said four wheels pivotally carried on axle assemblies for steering movement comprising, a steering wheel carried by said vehicle, a steering means including a plurality of interconnected members cooperating with said steering wheel and said four wheels for steering said four wheels responsive to movements of said steering wheel, a steering arm and power-assist actuator means included in said steering means and associated with each of said four wheels, said steering arm and said actuator means connected at one end, said steering arm connected at the other end to said wheel, said actuator means connected at the other end to said vehicle, means for adjusting the position of certain ones of said members, relative to others thereof, a plurality of pairs of pointers, one pointer of each pair of said pointers being carried by said steering means in cooperation with certain ones of said members, said one pointer of each pair of said pointers being also carried by said steering arm at said one end, said one pointer extending from said steering arm and said steering means, and the other pointer of each pair of pointers being carried at certain predetermined fixed positions in said vehicle and extending toward said one pointer of each pair so that said steering system is aligned when said pointers of each pair are positioned in closest proximity of said one to said other of said pair of pointers.

References Cited in the file of this patent
UNITED STATES PATENTS
1,217,105    Rodd _____ Feb. 20, 1917
(Other references on following page)

UNITED STATES PATENTS

| Number | Name | Date |
|---|---|---|
| 1,308,504 | Morrick et al. | July 1, 1919 |
| 1,731,558 | Wright | Oct. 15, 1929 |
| 1,866,393 | Brooks | July 5, 1932 |
| 1,967,283 | Brown | July 24, 1934 |
| 2,003,178 | Duby | May 28, 1935 |
| 2,251,584 | Fageol et al. | Aug. 5, 1941 |
| 2,354,830 | Reid | Aug. 1, 1944 |
| 2,815,732 | Majors | Dec. 10, 1957 |
| 2,945,470 | Kolbe | July 19, 1960 |
| 2,974,974 | Merritt | Mar. 14, 1961 |

FOREIGN PATENTS

| Number | Country | Date |
|---|---|---|
| 483,105 | Great Britain | Apr. 13, 1938 |